United States Patent
Singh et al.

(10) Patent No.: US 9,697,118 B1
(45) Date of Patent: Jul. 4, 2017

(54) MEMORY CONTROLLER WITH INTERLEAVING AND ARBITRATION SCHEME

(71) Applicant: FREESCALE SEMICONDUCTOR, INC., Austin, TX (US)

(72) Inventors: Vivek Singh, Noida (IN); Navdeep Singh Gill, Mumbai (IN); Stephan M. Herrmann, Markt Schwaben (DE); Sumit Mittal, Noida (IN)

(73) Assignee: NXP USA, INC., Austin, TX (US)

( * ) Notice: Subject to any disclaimer, the term of this patent is extended or adjusted under 35 U.S.C. 154(b) by 102 days.

(21) Appl. No.: 14/963,248

(22) Filed: Dec. 9, 2015

(51) Int. Cl.
*G06F 12/00* (2006.01)
*G06F 12/06* (2006.01)
*G06F 13/16* (2006.01)
*G06F 13/18* (2006.01)
*G06F 13/00* (2006.01)
*G06F 13/14* (2006.01)

(52) U.S. Cl.
CPC ...... *G06F 12/0646* (2013.01); *G06F 12/0607* (2013.01); *G06F 13/00* (2013.01); *G06F 13/14* (2013.01); *G06F 13/161* (2013.01); *G06F 13/1605* (2013.01); *G06F 13/1647* (2013.01); *G06F 13/1652* (2013.01); *G06F 13/18* (2013.01); *G06F 2212/1008* (2013.01)

(58) Field of Classification Search
CPC ............. G06F 12/0646; G06F 12/0607; G06F 2212/1008; G06F 13/00; G06F 13/14; G06F 13/1605; G06F 13/161; G06F 13/1647; G06F 13/1652; G06F 13/18
See application file for complete search history.

(56) References Cited

U.S. PATENT DOCUMENTS

| | | |
|---|---|---|
| 5,412,788 A | 5/1995 | Collins |
| 5,546,548 A | 8/1996 | Chen et al. |
| 5,684,973 A | 11/1997 | Sullivan et al. |
| 6,978,329 B1 | 12/2005 | Harral |
| 7,073,003 B2 | 7/2006 | Chae |
| 7,120,714 B2 | 10/2006 | O'Connor et al. |
| 2006/0271724 A1* | 11/2006 | Purcell ............... G06F 13/1642 711/5 |
| 2008/0244133 A1 | 10/2008 | Riocreux et al. |
| 2012/0079155 A1 | 3/2012 | Damodaran et al. |
| 2012/0254491 A1 | 10/2012 | Satpathy et al. |
| 2013/0097401 A1 | 4/2013 | Sarta |
| 2014/0068125 A1 | 3/2014 | Pullagoundapatti et al. |
| 2014/0115279 A1 | 4/2014 | Chirca et al. |

* cited by examiner

*Primary Examiner* — Shawn X Gu
(74) *Attorney, Agent, or Firm* — Charles E. Bergere

(57) ABSTRACT

A memory controller that implements an interleaving and arbitration scheme includes an address decoder that selects a memory bank for an access request based on a set of address least significant bits included in the access request. A core requiring sequential access to memory is routed to consecutive memory banks of the memory for consecutive access requests. When multiple cores request access to the same memory bank, an arbiter determines an access sequence for the cores. The arbiter can modify the access sequence without significantly increasing the complexity of the memory controller. The address decoder determines whether the selected memory banks are available and also whether an access request is a wide access request, in which case it selects two consecutive memory banks.

18 Claims, 2 Drawing Sheets

MEMORY CONTROLLER WITH INTERLEAVING AND ARBITRATION SCHEME

BACKGROUND

The present invention generally relates to integrated circuits, and, more particularly, to a memory controller.

Integrated circuits (ICs) often include multiple cores for processing data packets and a shared memory for storing the data packets. ICs also include a memory controller that manages communication between the cores and the shared memory. To access the data packets stored in the memory, a core issues an access request that includes a memory address. The memory controller grants access to the core only after an on-going transaction of a former core with the memory is completed. Thus, due to contention, the core must wait before it can access the memory. This waiting period is referred to as the dynamic latency of the core.

A known technique to reduce dynamic latency involves interleaving of memory addresses, which requires the shared memory to be divided into multiple memory banks. Each memory bank is accessible, independent of other memory banks. Interleaving of addresses involves mapping contiguous addresses to memory locations in separate memory banks. The interleaving scheme may depend on the size of a contiguous address block mapped to each memory bank, for instance, interleaving based on a page size, a cache-line, and an address boundary. The cores generate access requests that include addresses mapped to memory locations present in separate memory banks due to interleaving of the addresses. Thus, address interleaving permits a core to sequentially access separate memory banks. Address interleaving also permits different cores to simultaneously access separate memory banks, leading to a reduction in dynamic latency. However, as only one core can access a memory bank in one access cycle, a memory access conflict arises when multiple cores try to simultaneously access the same memory bank.

A known technique to resolve memory access conflicts involves including an arbiter in the memory controller. The memory controller assigns a priority level to each core based on factors such as the core type and the access request type, and then provides the cores access to the memory based priority levels (i.e., the sequence of access for the cores).

To ensure fair access to the cores (i.e., to prevent starvation of low priority access requests), the arbiter can modify the access sequence using arbitration techniques such as rotating priority, round robin, and least recently accessed core. However, these arbitration techniques do not allow a user to dynamically determine the access sequence, and hence, a select logic circuit is included in the arbiter to allow a user to configure the access sequence. However, including such select logic requires redesigning the existing arbiter, which increases the complexity of the circuit and the circuit area.

It would be advantageous to have a memory controller that provides multiple cores access to the memory with reduced dynamic latency and contention and dynamically determines the access sequence without significantly increasing the complexity of the memory controller and the circuit area.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
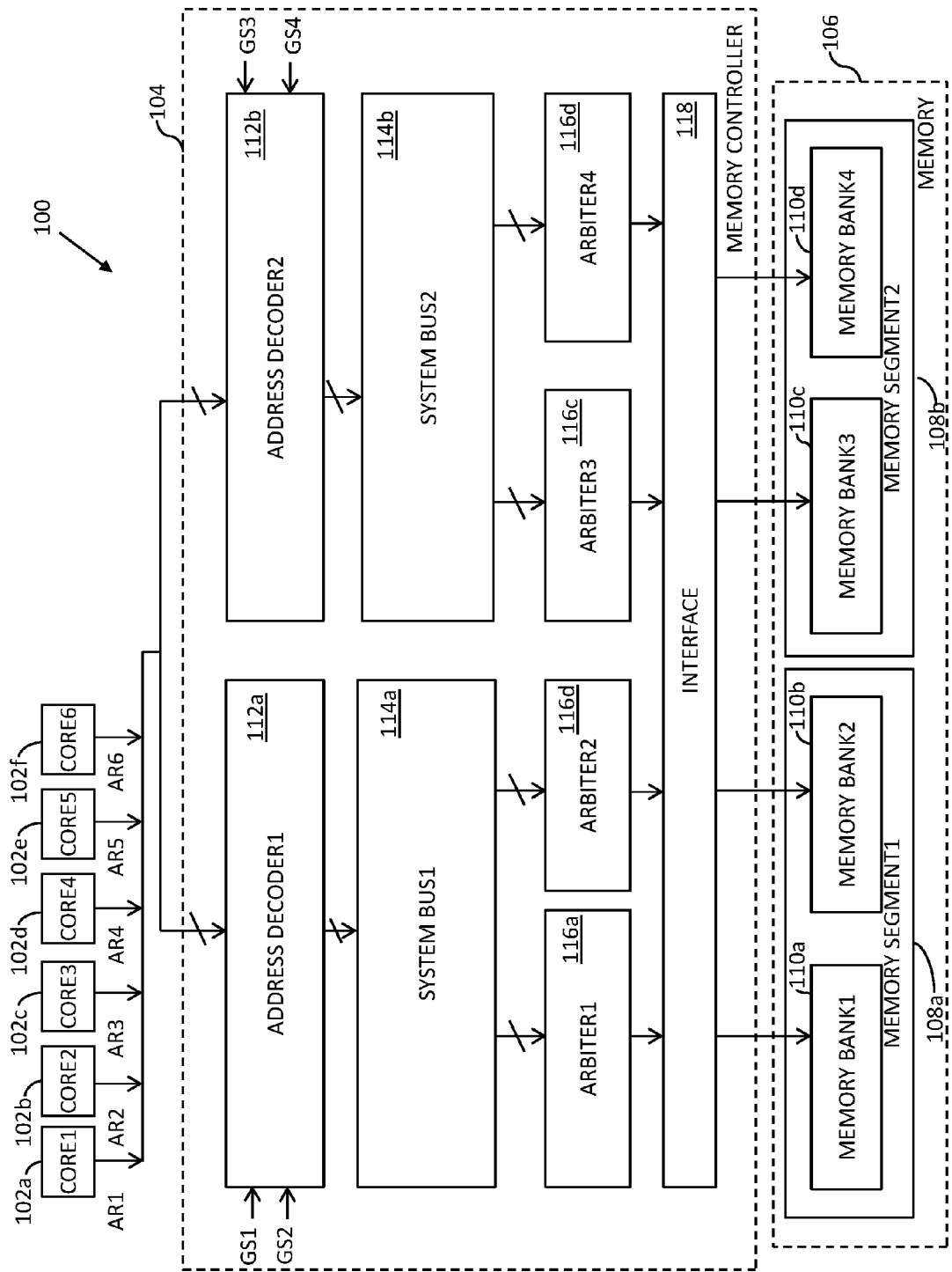
FIG. 1 is a schematic block diagram of an integrated circuit (IC) including a memory controller in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention. As used herein, the term multiplexer has been abbreviated as a mux.

In an embodiment of the present invention, a memory controller is provided. The memory controller is connected to a plurality of cores that include first and second cores and a first memory segment that includes first and second memory banks. The memory controller receives first and second access requests from the first core and a third access request from the second core. The second access request is consecutive to the first access request. The first through third access requests include first through third sets of address least significant bits (LSBs), respectively. The memory controller includes a first address decoder, a first system bus, a first arbiter, and a second arbiter. The first address decoder is connected to the plurality of cores including the first and second cores to receive the first through third access requests. The first address decoder selects the first memory bank based on the first and third sets of address LSBs and the second memory bank based on the second set of address LSBs. The first system bus is connected to the first address decoder to receive the first through third access requests and routes the first and third access requests to the first memory bank in a first sequence and the second access request to the second memory bank. The first sequence indicates an order of predetermined priority levels of the first and third access requests. The first arbiter includes first and second multiplexers, and a first priority encoder. The first arbiter is connected to the first system bus and the first memory bank and receives the first and third access requests in the first sequence. The first multiplexer has first and second input terminals to receive the first and third access requests, respectively, a select terminal to receive a first select signal, and an output terminal to output a first output access request signal. The second multiplexer has first and second input terminals to receive the third and first access requests, respectively, a select terminal to receive the first select signal, and an output terminal to output a second output access request signal. The first and second multiplexers output the first and third access requests as the first and second output access request signals, respectively, when the first select signal is at a first logic state. Thus, the first and second multiplexers determine a second sequence of the first and third access requests. The first priority encoder is connected to the output terminals of the first and second multiplexers to receive the first and second output access request signals, respectively. When the first select signal is at the first logic state, the priority encoder outputs the first and third access requests in the second sequence. Thus, the first arbiter provides at least one of the first and second cores access to the first memory bank in a first access cycle. The second arbiter is connected to the corresponding second memory bank and receives the second access request in a second access cycle that is consecutive to the first access cycle. The second arbiter then provides the first core access to the second memory bank.

In another embodiment of the present invention, an integrated circuit (IC) is provided. The IC includes a plurality of cores including first through fourth cores, a first memory segment, and a memory controller. The first core generates first and second access requests, and the second through fourth cores generate third through fifth access requests, respectively. The second access request is consecutive to the first access request. The first through fifth access requests include first through fifth sets of address LSBs, respectively. The first memory segment includes first and second memory banks. The memory controller receives the first through fifth access requests from the first through fourth cores. The memory controller is connected to the first memory segment and includes a first address decoder, a first system bus, and first and second arbiters. The first address decoder is connected to the plurality of cores including the first through fourth cores and receives the first through fifth access requests. The first address decoder selects the first memory bank based on the first and third through fifth sets of address LSBs and the second memory bank based on the second set of address LSBs. The first system bus is connected to the first address decoder and receives the first through fifth access requests. The first system bus routes the first and third through fifth access requests to the first memory bank in a first sequence and the second access request to the second memory bank. The first sequence indicates an order of predetermined priority levels of the first through fourth cores. The first arbiter is connected to the first memory bank and includes first and second sets of multiplexers, and a priority encoder. The first set of multiplexers is connected to the first system bus to receive the first and third through fifth access requests in the first sequence. The first set of multiplexers include first through fourth multiplexers that determine a second sequence of the first and third through fifth access requests. The first multiplexer has first and second input terminals that receive the first and fourth access requests, respectively, a select terminal that receives a first select signal, and an output terminal that outputs a first output access request signal. The second multiplexer has first and second input terminals that receive the third and fifth access requests, respectively, a select terminal that receives the first select signal, and an output terminal that outputs a second output access request signal. The third multiplexer has first and second input terminals that receive the fourth and first access requests, respectively, a select terminal that receives the first select signal, and an output terminal that outputs a third output access request signal. The fourth multiplexer has first and second input terminals that receive the fifth and third access requests, respectively, a select terminal that receives the first select signal, and an output terminal that outputs a fourth output access request signal. Thus, the first through fourth multiplexers output the first and third through fifth access requests as the first through fourth output access request signals, respectively, when the first select signal is at a first logic state. The second set of multiplexers is connected to the first set of multiplexers to receive the first and third through fifth access requests. The second set of multiplexers includes fifth through eighth multiplexers that determine a third sequence of the first and third through fifth access requests. The fifth multiplexer has first and second input terminals connected to the output terminals of the first and second multiplexers to receive the first and third access requests, respectively, a select terminal that receives a second select signal, and an output terminal that outputs a fifth output access request signal. The sixth multiplexer has first and second input terminals connected to the output terminals of the second and first multiplexers to receive the third and first access requests, respectively, a select terminal that receives the second select signal, and an output terminal that outputs a sixth output access request signal. The seventh multiplexer has first and second terminals connected to the output terminals of the third and fourth multiplexers to receive the fourth and fifth access requests, respectively, a select terminal that receives the second select signal, and an output terminal that outputs a seventh output access request signal. The eighth multiplexer has first and second input terminals connected to the output terminals of the fourth and third multiplexers to receive the fifth and fourth access requests, respectively, a select terminal that receives the second select signal, and an output terminal that outputs an eighth output access request signal. Thus, the fifth through eighth multiplexers output the first through fourth access requests as the fifth through eighth output access request signals, respectively, when the second select signal is at a first logic state. The priority encoder is connected to the fifth through eighth multiplexers to receive the fifth through eighth output access request signals. When the first and second select signals are at the first logic states, the priority encoder outputs the first and the third through fifth access requests in the third sequence. Thus, the first arbiter provides at least one of the first through fourth cores access to the first memory bank according to the third sequence in a first access cycle. The second arbiter receives the second access request in a second access cycle that is consecutive to the first access cycle. The second arbiter then provides the first core access to the second memory bank.

Various embodiments of the present invention provide a memory controller. The memory controller receives multiple access requests from multiple cores, respectively. An address decoder of the memory controller selects a memory bank within a memory segment based on a set of address LSBs in the access requests. Hence, a core requiring sequential access to the memory is routed to consecutive memory banks for consecutive access requests. When multiple cores compete for access to the same memory bank, an arbiter of the memory controller decides a sequence of access for the cores. The access sequence is decided based on the predetermined priority levels of the cores. The arbiter is configured to modify the access sequence to avoid the starvation of cores with lower predetermined priority levels. Also, the address decoder determines whether an access request is a wide access request and selects consecutive addresses from two memory banks for the wide access request.

Referring now to FIG. 1, a schematic block diagram of an integrated circuit (IC) 100 in accordance with an embodiment of the present invention is shown. The IC 100 includes a plurality of cores 102 including first through sixth cores 102a-102f, a memory controller 104, and a memory 106. The memory 106 includes a plurality of memory segments 108 including first and second memory segments 108a and 108b. Each memory segment 108 includes a plurality of memory banks 110. In an example, the first memory segment 108a includes first and second memory banks 110a and 110b, and the second memory segment 108b includes third and fourth memory banks 110c and 110d. In the presently preferred embodiment, the memory banks 110 include static random-access memories (SRAMs). The memory banks 110 may even include other types of memories such as, but are not limited to, dynamic random-access memories (DRAMs) and flash memories.

For each memory segment 108, the memory controller 104 includes an address decoder 112, a system bus 114, an arbiter 116 corresponding to each memory bank 110 in the memory segment 108. In an example, the memory controller 104 includes first and second address decoders 112a and 112b, first and second system buses 114a and 114b, and first through fourth arbiters 116a-116d. The first address decoder 112a and the first system bus 114a correspond to the first memory segment 108a, and the second address decoder 112b and the second system bus 114b correspond to the second memory segment 108b. The first through fourth arbiters 116a-116d are connected to the corresponding first through fourth memory banks 110a-110d, respectively, by way of an interface 118.

The first through sixth cores 102a-102f generate first through sixth access requests (AR1-AR6), respectively. The first through sixth access requests (AR1-AR6) include first through sixth sets of address least significant bits (LSBs), respectively.

The first and second address decoders 112a and 112b are connected to the first through sixth cores 102a-102f to receive the first through sixth access requests (AR1-AR6). The first address decoder 112a identifies each of the first and second memory banks 110a and 110b in the first memory segment 108a based on the first through sixth sets of address LSBs. The second address decoder 112b identifies each of the third and fourth memory banks 110c and 110d in the second memory segment 108b based on the first through sixth sets of address LSBs.

The first and second system buses 114a and 114b are connected to the first and second address decoders 112a and 112b, respectively, to receive at least one of the first through sixth access requests (AR1-AR6). Each of the first and second system buses 114a and 114b routes the first through sixth access requests (AR1-AR6) to the corresponding memory banks 110 when the corresponding memory banks 110 are available for a memory access. Each of the first and second system buses 114a and 114b stalls the first through sixth access requests (AR1-AR6) to the corresponding memory banks 110 when the corresponding memory banks 110 are unavailable for a memory access. Each of the first and second system buses 114a and 114b routes more than one access requests of the first though sixth access requests (AR1-AR6) to a single memory bank 110 in a sequence. This sequence indicates an order of predetermined priority levels of the cores 102 corresponding to the access requests. Each of the first and second system buses 114a and 114b is a matrix that stores and routes the access requests according to the corresponding memory banks 110. The matrix is an N*M matrix that stores and routes N access requests by N cores 102 corresponding to M memory banks 110.

The first arbiter 116a is connected to the first system bus 114a and is configured to modify the access sequence to avoid starvation of the cores 102. When the first through sixth cores 102a-102f access the first memory bank 110a, the first arbiter 116a provides at least one of the first through sixth cores 102a-102f access to the first memory bank 110a in an access cycle.

The second arbiter 116b is connected to the first system bus 114a, and the third and fourth arbiters 116c and 116d are connected to the second system bus 114b.

Figure 2:
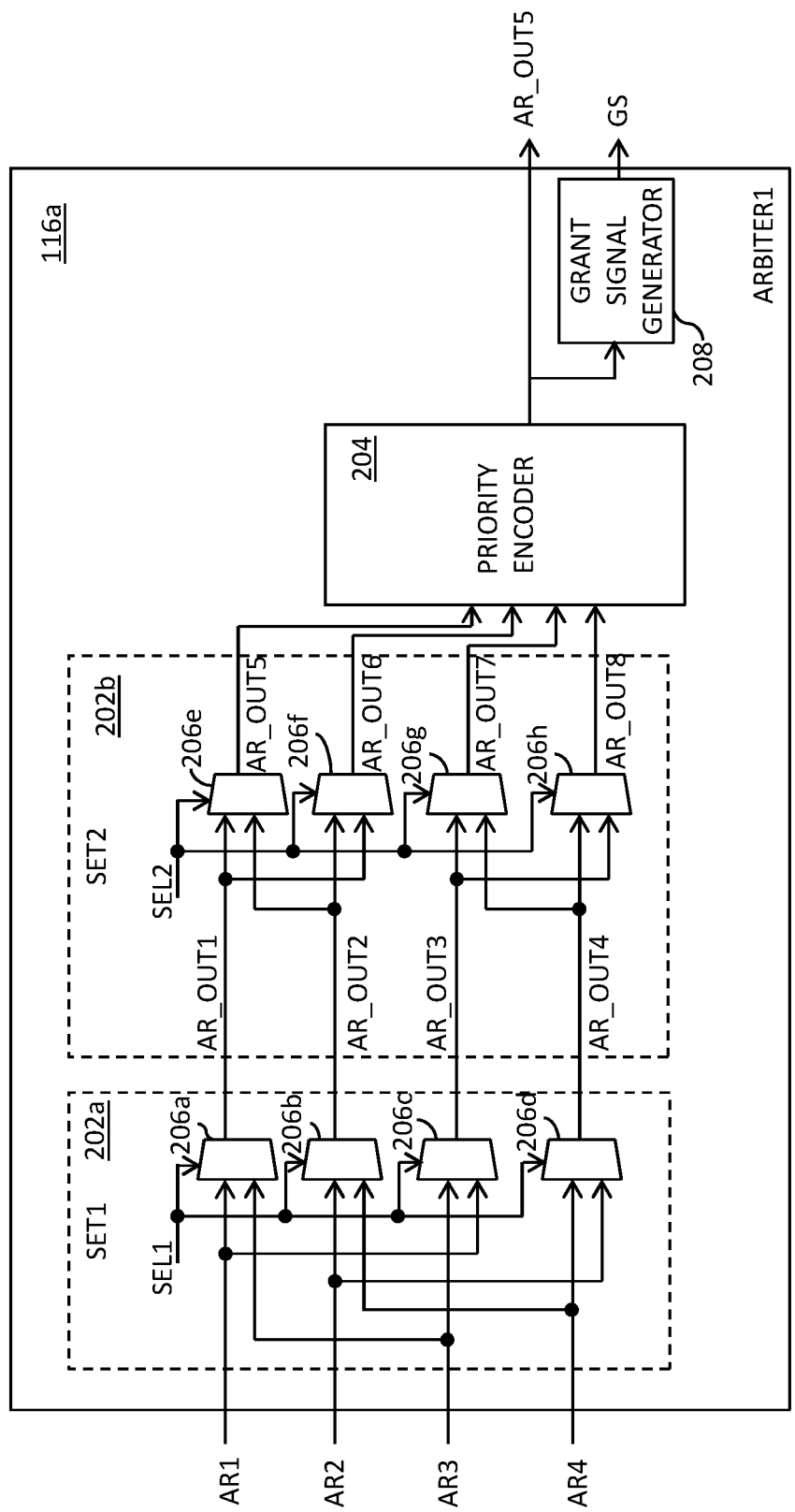
FIG. 2 is a schematic block diagram of an arbiter of the memory controller of FIG. 1 in accordance with an embodiment of the present invention.

Referring now to FIG. 2, a schematic block diagram of the first arbiter 116a in accordance with an embodiment of the present invention is shown. The first arbiter 116a includes first and second sets of muxes 202a and 202b, and a priority encoder 204. In an example, the first set of muxes 202a includes first through fourth muxes 206a-206d, and the second set of muxes 202b includes fifth through eighth muxes 206e-206h. The first through eighth muxes 206a-206h are 2:1 muxes. The first arbiter 116a also includes a grant generator 208. In one example, the first arbiter 116a receives first through fourth access requests (AR1-AR4) from the first system bus 114a. The number of sets of muxes 202 and the number of muxes 206 in each set of muxes 202 depends on the number of cores 102 handled by an arbiter 116. In the presently preferred embodiment, the second through fourth arbiters 116b-116d are structurally and functionally similar to the first arbiter 116a.

The first mux 206a has first and second input terminals connected to the first system bus 114a to receive the first and third access requests (AR1 and AR3), respectively. The first mux 206a also has a select terminal that receives a first select signal (SEL1) and an output terminal that outputs a first output access request signal (AR_OUT1).

The second mux 206b has first and second input terminals connected to the first system bus 114a to receive the second and fourth access requests (AR2 and AR4), respectively. The second mux 206b also has a select terminal that receives the first select signal (SEL1) and an output terminal that outputs a second output access request signal (AR_OUT2).

The third mux 206c has first and second input terminals connected to the first system bus 114a to receive the third and first access requests (AR3 and AR1), respectively. The third mux 206c also has a select terminal that receives the first select signal (SEL1) and an output terminal that outputs a third output access request signal (AR_OUT3).

The fourth mux 206d has first and second input terminals connected to the first system bus 114a to receive the fourth and second access requests (AR4 and AR2), respectively. The fourth mux 206d also has a select terminal that receives the first select signal (SEL1) and an output terminal that outputs a fourth output access request signal (AR_OUT4). Thus, the first select signal (SEL1) provided to the first through fourth muxes 206a-206d configures the first arbiter 116a to rearrange first and second sets of access requests, including the first and second access requests (AR1 and AR2), and the third and fourth access requests (AR3 and AR4), respectively.

The fifth mux 206e has first and second input terminals connected to the output terminals of the first and second muxes 206a and 206b to receive the first and second output access request signals (AR_OUT1 and AR_OUT2), respectively. The fifth mux 206e also has a select terminal that receives a second select signal (SEL2) and an output terminal that outputs a fifth output access request signal (AR_OUT5).

The sixth mux 206f has first and second input terminals connected to the output terminals of the second and first muxes 206b and 206a to receive the second and first output access request signals (AR_OUT2 and AR_OUT1), respectively. The sixth mux 206f also has a select terminal that receives the second select signal (SEL2) and an output terminal that outputs a sixth output access request signal (AR_OUT6).

The seventh mux 206g has first and second input terminals connected to the output terminals of the third and fourth muxes 206c and 206d to receive the third and fourth output access request signals (AR_OUT3 and AR_OUT4), respectively. The seventh mux 206g also has a select terminal that receives the second select signal (SEL2) and an output terminal that outputs a seventh output access request signal (AR_OUT7).

The eighth mux 206h has first and second input terminals connected to the output terminals of the fourth and third muxes 206d and 206c to receive the fourth and third output access request signals (AR_OUT4 and AR_OUT3), respectively. The eighth mux 206h also has a select terminal that receives the second select signal (SEL2) and an output terminal that outputs an eighth output access request signal (AR_OUT8). The first through fourth output access request signals (AR_OUT1-AR_OUT4) represent the first through fourth access requests (AR1-AR4) in a modified sequence. Thus, the second select signal (SEL2) provided to the fifth through eighth muxes 206e-206h configures the first arbiter 116a to rearrange the first and second access requests (AR1 and AR2) of the first set of access requests, and the third and fourth access requests (AR3 and AR4) of the second set of access requests. In an embodiment, the first and the second select signals (SEL1 AND SEL2) are provided by the user.

Thus, the first and second sets of muxes 202a and 202b modify the access sequence for the first through fourth cores 102a-102d, based on the first and second select signals (SEL1 and SEL2), respectively. The fifth through eighth output access request signals (AR_OUT5-AR_OUT8) correspond to a modified access sequence for the first through fourth cores 102a-102d.

The first priority encoder 206 has first through fourth input terminals connected to the output terminals of the fifth through eighth muxes 206e-206h to receive the fifth through eighth output access request signals (AR_OUT5-AR_OUT8), respectively. Since the fifth output access request signal (AR_OUT5) is received at the first input terminal, the fifth output access request signal (AR_OUT5) has the highest modified priority, and hence, the priority encoder 206 outputs the fifth output access request signal (AR_OUT5) at its output terminal. Thus, priority encoder 206 provides at least one of the first through fourth cores 102a-102d access to the first memory bank 110a.

In an embodiment, the grant generator 208 is connected to the output terminal of the first priority encoder 206 and receives one of the first through fourth access requests (AR1-AR4). The grant generator 208 generates a grant signal (GS) at a first logic state when the first memory bank 110a is available for memory access and at a second logic state when the first memory bank 110a is unavailable for memory access. The first memory bank 110a is unavailable for memory access in an access cycle when the first arbiter 116a provides one of the first through fourth cores 102a-102d access to the first memory bank 110a in the access cycle. The first address decoder 112a receives the grant signal (GS) and determines whether the first memory bank 110a is available for memory access.

In operation, the first and second address decoders 112a and 112b receive the first though sixth access requests (AR1-AR6). The first and second address decoders 112a and 112b also receive a seventh access request (AR7) from the first core 102a. The seventh access request (AR7) includes a seventh set of address LSBs. The first address decoder 112a selects the first memory bank 110a, based on the first through fourth sets of address LSBs and the second memory bank 110b, based on the fifth and seventh sets of address LSBs. The second address decoder 112b selects the third memory bank 110c, based on the sixth set of address LSBs.

The first address decoder 112a determines that the first and second memory banks 110a and 110b are available for memory access in a first access cycle when the first and second grant signals (GS1 and GS2) corresponding to the first and second banks 110a and 110b, respectively, are at the first logic state. The second address decoder 112b determines that the third memory bank 110c is available for memory access in the first access cycle when the third grant signal (GS3) corresponding to the third memory bank 110c is at the first logic state. The first system bus 114a routes the first through fourth access requests (AR1-AR4) in a first sequence to the first arbiter 116a that corresponds to the first memory bank 110a. Since the first through fourth cores 102a-102d request the memory controller 104 access to the first memory bank 110a simultaneously, an access conflict arises.

The first through fourth muxes 206a-206d receive the first through fourth access requests (AR1-AR4) in the first sequence and the first select signal (SEL1). The first mux 206a receives the first and third access requests (AR1 and AR3), and the second mux 206b receives the second and fourth access requests (AR2 and AR4). The third mux 206c receives the third and first access requests (AR3 and AR1), and the fourth mux 206d receives the fourth and second access requests (AR4 and AR2).

The first through fourth muxes 206a-206d output the first through fourth access requests (AR1-AR4) as the first through fourth output access request signals (AR_OUT1-AR_OUT4), respectively, when the first select signal (SEL1) is at the first logic state. Thus, the first through fourth muxes 206a-206d determine a second sequence of access for the first through fourth cores 102a-102d, based on the first select signal (SEL1).

The fifth through eighth muxes 206e-206h receive the first through fourth access requests (AR1-AR4) in the second sequence and the second select signal (SEL2). The fifth mux 206e receives the first and second access requests (AR1 and AR2), and the sixth mux 206f receives the second and first access requests (AR2 and AR1). The seventh mux 206g receives the third and fourth access requests (AR3 and AR4), and the eighth mux 206h receives the fourth and third access requests (AR4 and AR3). The fifth through eighth muxes 206e-206h output the first through fourth access requests (AR1-AR4) as the fifth through eighth output access request signals (AR_OUT5-AR_OUT8), respectively, when the second select signal (SEL2) is at the first logic state. The fifth through eighth muxes 206e-206h determine a third sequence of access for the first through fourth cores 102a-102d, based on the second select signal (SEL2). The priority encoder 206 receives the first through fourth access requests (AR1-AR4) at the first through fourth input terminals, respectively. The priority encoder 206 outputs the first through fourth access requests (AR1-AR4) in a descending order of priority with the first access request (AR1) having the highest priority. Thus, the first core 102a has the highest modified priority level according to the third sequence and so, the first arbiter 116a provides the first core 102a access to the first memory bank 110a in the first access cycle. Therefore, the first arbiter 116a generates the first grant signal (GS1) at the second logic state, indicating that the first memory bank 110a is unavailable for memory access in the first access cycle.

The first and second system buses 114a and 114b route the fifth and sixth access requests (AR5 and AR6) to the second and third arbiters 116b and 116c. However, since a single core, i.e., the fifth core 102e, requests access to the second memory bank 110b, no memory access conflict arises for accessing the second memory bank 110b. Thus, the second arbiter 116b grants the fifth core 102e access to the second memory bank 110b of the first memory segment 108a in the first access cycle. Similarly, since a single core, i.e., the sixth core 102f, requests access to the third memory bank 110c, the third arbiter 116c grants the sixth core 102f access to the third memory bank 110c of the second memory segment 108b in the first access cycle. Hence, the second and third arbiters 116b and 116c generate the second and third grant signals (GS2 and GS3), respectively, at the second logic states in the first access cycle, indicating that the second and third memory banks 110b and 110c are unavailable for memory accesses, respectively, in the first access cycle.

Further, the seventh access request (AR7) generated by the first core 102a is consecutive to the first access request (AR1). Hence, the first address decoder 112a selects the second memory bank 110b, based on the seventh set of address LSBs. The first address decoder 112a also determines that the second memory bank 110b is available for memory access in a second access cycle when the second grant signal (GS2) is at the first logic state. The first arbiter 116a grants the first core 102a access to the first memory bank 110a for the first access request (AR1) in the first access cycle. The first system bus 114a routes the seventh access request (AR7) to the second memory bank 110b in the second access cycle that is consecutive to the first access cycle. The second arbiter 116b grants the first core 102a access to the second memory bank 110b for the seventh access request (AR7).

Each memory location of a memory bank 110 includes a fixed number of bits that corresponds with the width of the memory bank 110. The first address decoder 112a examines the first though sixth access requests (AR1-AR6) to detect that the second access request (AR2) has more bits than the width of the memory bank 110. Thus, the first address decoder 112a determines that the second access request (AR2) is a wide access request and selects first and second addresses of the first and second memory banks 110a and 110b, respectively, for the wide access request. The first address is consecutive to the second address. The first address decoder 112a determines that the first and second memory banks 110a and 110b are available for memory access in a third access cycle when the first and second grant signals (GS1 and GS2) are at the first logic state. The first system bus 114a routes the wide access request to the first and second memory banks 110a and 110b when the first and second memory banks 110a and 110b are available for memory access. Thus, the first and second arbiters 116a and 116b simultaneously provide the second core 102b with the wide access request access to the first and second memory banks 110a and 110b in the third access cycle. The first and second arbiters 116a and 116b generate the first and second grant signals (GS1 and GS2) at the second logic state, indicating that the first and second memory banks 110a and 110b are unavailable for memory access in the third access cycle.

Thus, the memory controller 104 implements an interleaving and arbitration scheme and resolves the contention among the first through fourth cores 102a-102d on access to the first memory bank 110a by determining the third sequence of access for the first through fourth cores 102a-102d. The memory controller 104 modifies the sequence of the predetermined priority levels of the first through fourth cores 102a-102d to avoid starvation of cores 102 with lower priority levels. The memory controller 104 provides the first, fifth, and sixth cores 102a, 102e, and 102f access to the first through third memory banks 110a-110c, respectively, in the first access cycle. Thus, the memory controller 104 achieves a high bandwidth of data transfer in the first access cycle. The memory controller 104 also routes the first and seventh access requests (AR1 and AR7) from the first core 102a to the first and second memory banks 110a and 110b, respectively, in the first and second access cycles, respectively. The second access cycle is consecutive to the first access cycle, leading to reduction in the dynamic latency of the first core 102a. Further, the memory controller 104 handles the second access request (AR2) as a wide access request by providing the second core 102b access to the first and second memory banks 110a and 110b in the third access cycle.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A memory controller, connected to a plurality of cores and a first memory segment, wherein the plurality of cores include first and second cores and the first memory segment includes first and second memory banks, and wherein the memory controller receives first and second access requests from the first core and a third access request from the second core, wherein the second access request is consecutive to the first access request, and wherein the first through third access requests include first through third sets of address least significant bits (LSBs), respectively, the memory controller comprising:

a first address decoder that is connected to the first and second cores, receives the first through third access requests, and selects the first memory bank based on the first and third sets of address LSBs and the second memory bank based on the second set of address LSBs;

a first system bus that is connected to the first address decoder, receives the first through third access requests, and routes the first and third access requests to the first memory bank in a first sequence and the second access request to the second memory bank, wherein the first sequence indicates an order of predetermined priority levels of the first and second cores;

a first arbiter, connected to the first system bus and the first memory bank, that receives the first and third access requests in the first sequence, wherein the first arbiter comprises:

a first multiplexer having first and second input terminals that receive the first and third access requests, respectively, a select terminal that receives a first select signal, and an output terminal that outputs a first output access request signal;

a second multiplexer having first and second input terminals that receive the third and first access requests, respectively, a select terminal that receives the first select signal, and an output terminal that outputs a second output access request signal, wherein the first and second multiplexers output the first and third access requests as the first and second output access request signals, respectively, when the first select signal is at a first logic state, thereby determining a second sequence of the first and third access requests; and a first priority encoder that is connected to the output terminals of the first and second multiplexers and receives the first and second output access request signals, respectively, wherein when the first select signal is at the first logic state, the priority encoder outputs the first and third access requests in the second sequence and the first arbiter provides at least one of the first and second cores access to the first memory bank based on the second sequence in a first access cycle; and a second arbiter, connected to the first system bus and the second memory bank, that receives the second access request in a second access cycle, and provides the first core access to the second memory bank, wherein the second access cycle is consecutive to the first access cycle.

2. The memory controller of claim 1, wherein the plurality of cores include third and fourth cores, and wherein the first address decoder is connected to the third and fourth cores to receive fourth and fifth access requests, respectively, and wherein the fourth and fifth access requests include fourth and fifth sets of address LSBs, respectively.

3. The memory controller of claim 2, wherein the first address decoder selects the second memory bank based on the fourth and fifth sets of address LSBs.

4. The memory controller of claim 3, wherein the first system bus routes the fourth and fifth access requests to the second memory bank in a third sequence that indicates an order of predetermined priority levels of the third and fourth cores.

5. The memory controller of claim 4, wherein the second arbiter receives the fourth and fifth access requests in the third sequence, and wherein the second arbiter comprises:
a third multiplexer having first and second input terminals that receive the fourth and fifth access requests, respectively, a select terminal that receives a second select signal, and an output terminal that outputs a third output access request signal;
a fourth multiplexer having first and second input terminals that receive the fifth and fourth access requests, respectively, a select terminal that receives the second select signal, and an output terminal that outputs a fourth output access request signal, wherein the third and fourth multiplexers output the fourth and fifth access requests as the third and fourth output access request signals, respectively, when the second select signal is at the first logic state, thereby determining a fourth sequence of the fourth and fifth access requests; and
a second priority encoder that is connected to the output terminals of the third and fourth multiplexers to receive the third and fourth output access request signals, respectively, wherein when the second select signal is at the first logic state, the priority encoder outputs the fourth and fifth access requests in the fourth sequence and the second arbiter provides at least one of the third and fourth cores access to the second memory bank in the fourth sequence in the first access cycle.

6. The memory controller of claim 1, wherein the first and second memory banks each include a static random-access memory (SRAM).

7. The memory controller of claim 1 further comprising:
a second address decoder that is connected to the plurality of cores including a third core, receives a fourth access request generated by the third core, and selects a third memory bank of a second memory segment connected to the memory controller based on a fourth set of address LSBs included in the fourth access request;
a second system bus that is connected to the second address decoder to receive the fourth access request, and routes the fourth access request to the third memory bank; and
a third arbiter, connected to the second system bus and the third memory bank, that receives the fourth access request, and provides the third core access to the third memory bank in the first access cycle.

8. The memory controller of claim 1, wherein the first and second arbiters generate first and second grant signals, respectively, and wherein logic states of the first and second grant signals indicate an availability of the first and second memory banks for memory access, respectively.

9. The memory controller of claim 8, wherein the first address decoder is connected to the first and second arbiters to receive the first and second grant signals, respectively, and determines whether the first and second memory banks are available for memory access based on the logic states of the first and second grant signals, respectively.

10. The memory controller of claim 9, wherein the first address decoder detects the third access request as a wide access request, and selects first and second addresses of the first and second memory banks, respectively, for the wide access request, and wherein the first address is consecutive to the second address.

11. The memory controller of claim 10, wherein the first system bus routes the wide access request to the first and second memory banks when the first and second memory banks are available for memory access.

12. The memory controller of claim 11, wherein the first and second arbiters provide the second core access to the first and second memory banks in a third access cycle.

13. An integrated circuit, comprising:
a plurality of cores including a first core that generates first and second access requests, and second through fourth cores that generate third through fifth access requests, respectively, wherein the second access request is consecutive to the first access request, and wherein the first through fifth access requests include first through fifth sets of address least significant bits (LSBs), respectively;
a first memory segment including first and second memory banks; and
a memory controller, connected to the first through fourth cores to receive the first through fifth access requests, and connected to the first memory segment, the memory controller comprising:
a first address decoder that is connected to the first through fourth cores to receive the first through fifth access requests, and selects the first memory bank based on the first and the third through fifth sets of address LSBs and the second memory bank based on the second set of address LSBs;
a first system bus that is connected to the first address decoder to receive the first through fifth access requests, and routes the first and the third through fifth access requests to the first memory bank in a first sequence and the second access request to the second memory bank, wherein the first sequence indicates an order of predetermined priority levels of the first through fourth cores;
a first arbiter, connected to the corresponding first memory bank, comprising:
a first set of multiplexers, connected to the first system bus, that receives the first and the third through fifth access requests in the first sequence and determines a second sequence of the first and the third through fifth access requests, the first set of multiplexers comprising:
a first multiplexer having first and second input terminals that receive the first and fourth access requests, respectively, a select terminal that receives a first select signal, and an output terminal that outputs a first output access request signal;

a second multiplexer having first and second input terminals that receive the third and fifth access requests, respectively, a select terminal that receives the first select signal, and an output terminal that outputs a second output access request signal;

a third multiplexer having first and second input terminals that receive the fourth and first access requests, respectively, a select terminal that receives the first select signal, and an output terminal that outputs a third output access request signal; and a fourth multiplexer having first and second input terminals that receive the fifth and third access requests, respectively, a select terminal that receives the first select signal, and an output terminal that outputs a fourth output access request signal, wherein the first through fourth multiplexers output the first and the third through fifth access requests as the first through fourth output access request signals, respectively, when the first select signal is at a first logic state, thereby determining the second sequence of the first and the third through fifth access requests;

a second set of multiplexers, connected to the first set of multiplexers, that receives the first and the third through fifth access requests in the second sequence and determines a third sequence of the first and the third through fifth access requests, the second set of multiplexers comprising:

a fifth multiplexer having first and second input terminals connected to the output terminals of the first and second multiplexers to receive the first and third access requests, respectively, a select terminal that receives a second select signal, and an output terminal that outputs a fifth output access request signal;

a sixth multiplexer having first and second input terminals connected to the output terminals of the second and first multiplexers to receive the third and first access requests, respectively, a select terminal that receives the second select signal, and an output terminal that outputs a sixth output access request signal;

a seventh multiplexer having first and second input terminals connected to the output terminals of the third and fourth multiplexers to receive the fourth and fifth access requests, respectively, a select terminal that receives the second select signal, and an output terminal that outputs a seventh output access request signal; and an eighth multiplexer having first and second input terminals connected to the output terminals of the fourth and third multiplexers to receive the fifth and fourth access requests, respectively, a select terminal that receives the second select signal, and an output terminal that outputs an eighth output access request signal, wherein the fifth through eighth multiplexers output the first and the third through fifth access requests as the fifth through eighth output access request signals, respectively, when the second select signal is at the first logic state, thereby determining the third sequence of the first and the third through fifth access requests; and a priority encoder that is connected to the output terminals of the fifth through eighth multiplexers to receive the fifth through eighth output access request signals, respectively, wherein when the first and second select signals are at the first logic states, the priority encoder outputs the first and the third through fifth access requests in the third sequence and the first arbiter provides at least one of the first through fourth cores access to the first memory bank according to the third sequence in a first access cycle; and a second arbiter, connected to the second memory bank, that receives the second access request in a second access cycle, and provides the first core access to the second memory bank, wherein the second access cycle is consecutive to the first access cycle.

14. The integrated circuit of claim 13, wherein the first and second memory banks each include a static random-access memory (SRAM).

15. The integrated circuit of claim 13, further comprising:
a second address decoder that is connected to the plurality of cores including a fifth core, receives a sixth access request generated by the fifth core, and selects a third memory bank of a second memory segment connected to the memory controller based on a sixth set of address LSBs included in the sixth access request;
a second system bus that is connected to the second address decoder to receive the sixth access request, and routes the sixth access request to the third memory bank; and
a third arbiter that, connected to the second system bus and the third memory bank, that receives the sixth access request, and provides the fifth core access to the third memory bank in the first access cycle.

16. The integrated circuit of claim 13, wherein the first and second arbiters generate first and second grant signals, respectively, and wherein logic states of the first and second grant signals indicate an availability of the first and second memory banks for memory access, respectively.

17. The integrated circuit of claim 16, wherein the first address decoder is connected to the first and second arbiters to receive the first and second grant signals, respectively, determines whether the first and second memory banks are available for memory access based on the logic states of the first and second grant signals, respectively, detects the third access request as a wide access request, and selects first and second addresses of the first and second memory banks, respectively, for the wide access request, and wherein the first address is consecutive to the second address.

18. The integrated circuit of claim 17, wherein the first and second arbiters provide the second core access to the first and second memory banks in a third access cycle.

* * * * *